Dec. 29, 1953    W. J. MUELLER ET AL    2,664,310
DUMP CART

Filed Dec. 27, 1949    2 Sheets-Sheet 1

INVENTORS
Wesley J. Mueller
Irving R. Smith
BY
Morsell & Morsell
ATTORNEYS.

Dec. 29, 1953  W. J. MUELLER ET AL  2,664,310
DUMP CART
Filed Dec. 27, 1949  2 Sheets-Sheet 2
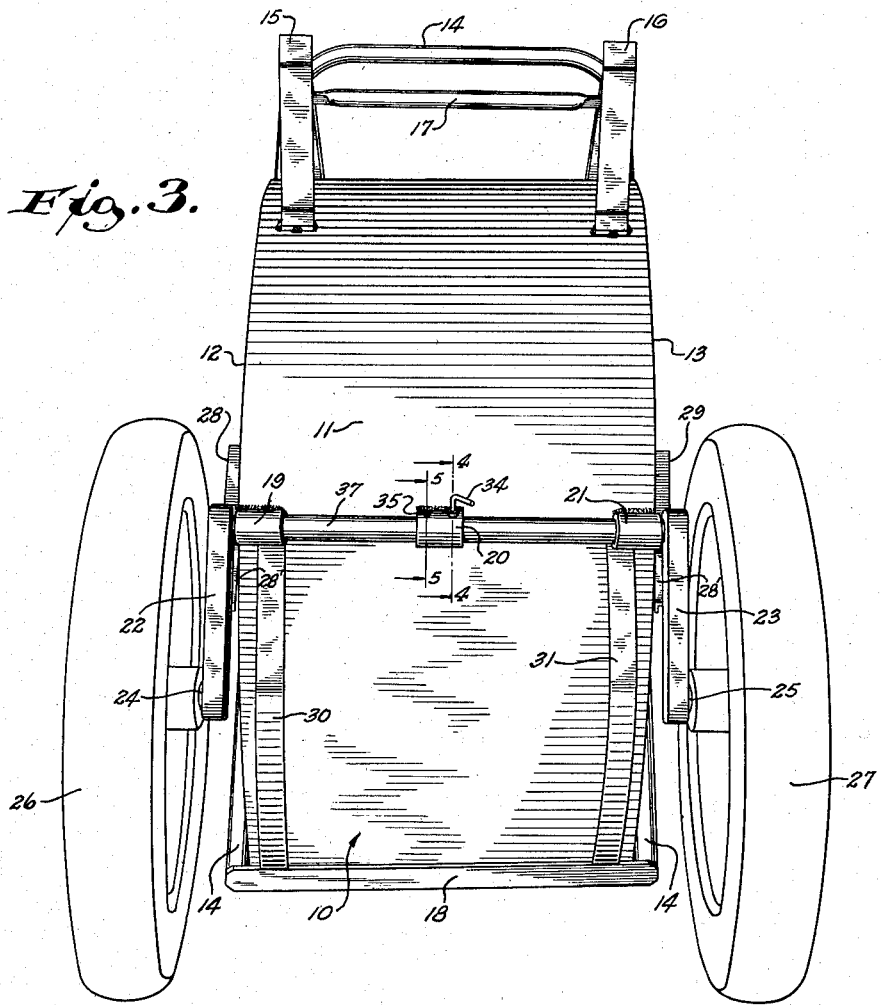
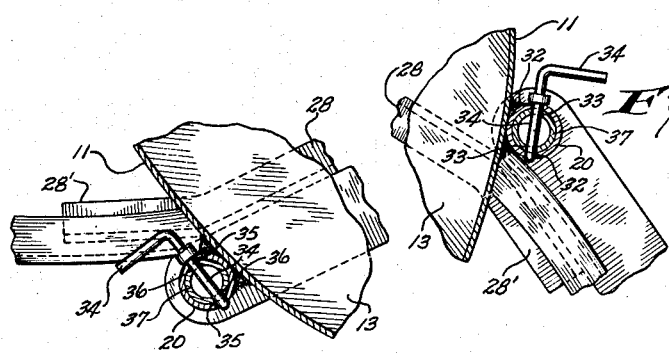
INVENTORS
Wesley J. Mueller
Irving R. Smith
BY
Morsell & Morsell
ATTORNEYS Patented Dec. 29, 1953

2,664,310

UNITED STATES PATENT OFFICE 2,664,310

DUMP CART

Wesley J. Mueller and Irving R. Smith, Milwaukee, Wis., assignors to Sterling Wheelbarrow Company, Milwaukee, Wis., a corporation of Wisconsin Application December 27, 1949, Serial No. 135,118

5 Claims. (Cl. 298—5)

1

This invention relates to improvements in carts and more particularly to dump carts.

Our prior patent, Number 2,189,079, discloses a dump cart which may be furnished in a size to accommodate the entire discharge of a standard concrete mixer and which is readily operable by one man, the cart being tiltable to dumping position without lifting the wheels off of the ground.

It is a general object of the present invention to provide an improved cart construction wherein the body of the cart is tiltable to a greater dumping angle, thereby insuring quick removal of the load therefrom.

A further object of the invention is to provide an improved cart which can be locked in dumping position to facilitate cleaning of its interior and to prevent the collection of water or other material therein during storage.

A further object of the invention is to provide an improved cart of the class described which can also be locked in normal load carrying position.

A further object of the invention is to provide an improved cart of the class described wherein the parts thereof move freely during dumping or return, there being no intermediate critical positions requiring special manual or other adjustment in order to complete the movement from one extreme position to the other.

A further object of the invention is to provide an improved cart of the class described which is simple in construction, strong and durable, and otherwise well adapted for the purposes described.

With the above and other objects in view the invention consists of the improved cart, and all of its parts and combinations, as set forth in the claims, and all equivalents thereof.

In the drawings accompanying and forming a part of this specification, wherein is shown one complete embodiment of the preferred form of the invention, and wherein like characters of reference indicate the same parts in all of the views:

Fig. 3 is a perspective rear view of the improved cart in the position of Fig. 2;

Fig. 4 is a fragmentary vertical sectional view taken approximately along the line 4—4 of Fig. 3; and Fig. 5 is a view similar to Fig. 4, but taken along the line 5—5 of Fig. 3 when the body of the improved cart is in normal position.

Figure 1:
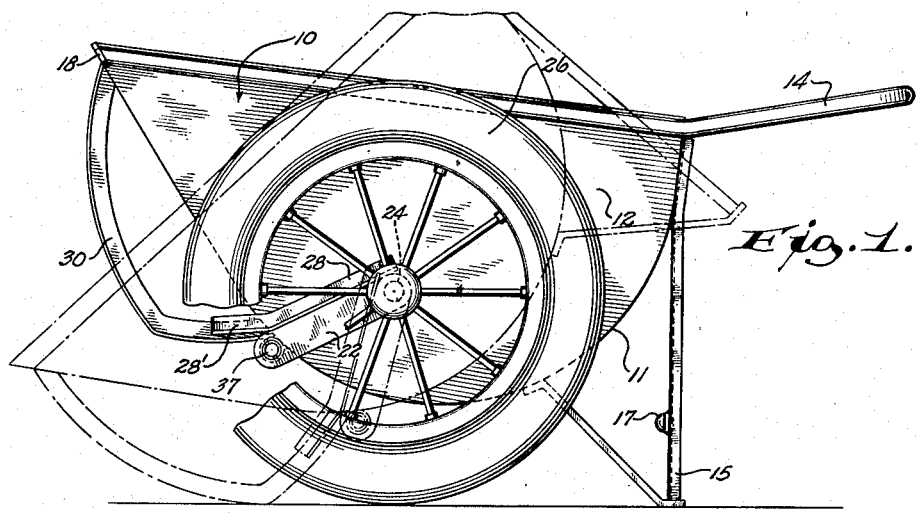
Fig. 1 is a side view of the improved cart with the body thereof in normal position, part of one of the cart wheels being broken away, the dot and dash lines showing the cart tilted part way toward dumping position.

In the drawings, the numeral 10 designates the body portion of the improved cart, said body being adapted to serve as a receptacle for concrete or other material. The body 10 has an open top and has an arcuate bottom 11, as well as a pair of substantially parallel vertical side walls 12 and 13. The bottom 11 and the walls 12 and 13 are preferably of sheet metal construction.

A generally U-shaped tubular handle 14 is fixed to the body 10 with the arms of said handle positioned adjacent the upper margin of said body, as shown. A pair of spaced rear legs 15 and 16 project downwardly from the rear end of the body 10 and are interconnected by a transversely extending tie rod 17. A bar member 18 is fixed to the front edge of the body 10 and has its ends secured, as by welding, to the ends of the handle 14.

Preferably three spaced, coaxial sleeve bearings 19, 20 and 21 are fixed, as by welding, to the underside of the bottom wall 11 (see Fig. 3). A tubular axle 37 is rotatably mounted in said sleeve bearings, and fixed to or formed on the outer ends of said axle, outwardly of the bearings 19 and 21 respectively, are crank arms 22 and 23, the latter being substantially coplanar. The outer ends of the crank arms 22 and 23 are formed with outwardly projecting stub axles 24 and 25, said stub axles being coaxial with respect to each other and parallel with the axle 37. A pair of rubber tired wheels 26 and 27 are rotatably mounted on the stub axles 24 and 25. The wheels are preferably of a diameter such that they project above the upper margin of the body 10, as shown.

Figure 2:
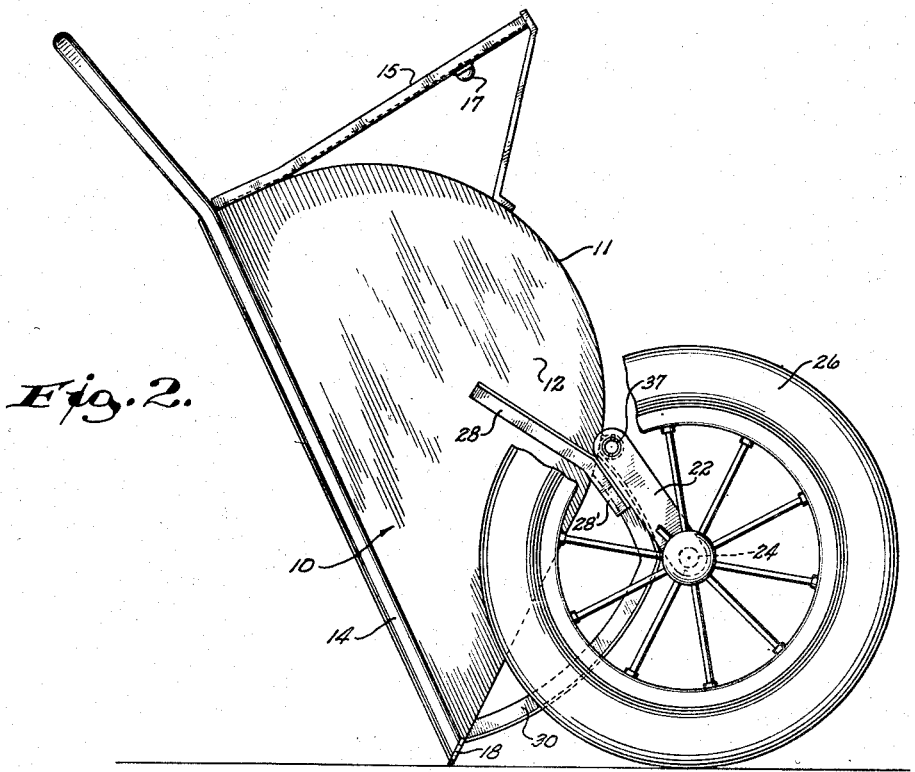
Fig. 2 is a view similar to Fig. 1 showing the body of the improved cart in dumping position.

It will be noted from Fig. 1 that the axle 37 is positioned well forwardly of the lowermost portion of the body 10, and also well forwardly of a point midway of the length of said body. Fixed to the outer surface of the sidewalls 12 and 13 and extending upwardly and rearwardly from adjacent the axle 37, are angle bar stop members 28 and 29 which are adapted to be engaged by the crank arms 22 and 23, as shown in Fig. 1, when the body 10 is in normal upright position. The stop members 28 and 29 have end portions 28' and 29' which project forwardly of the bottom wall 11 of the body 10, as shown in Fig. 1, said end portions being adapted to be engaged by the crank arms 22 and 23 when the body 10 is in dumping position, as shown in Fig. 2. It will be noted that the stop members 28—28' and 29—29' permit pivotal movement of the crank arms 22 and 23 and the axle 37 in excess of 180 degrees.

Fixed at one end to the bottom wall 11 adjacent the bar 18 are a pair of spaced rocker members 30 and 31. The rockers are positioned adjacent the sides of the body 10 and extend from the bar 18 downwardly and rearwardly, as shown in Fig. 1. The rockers are fixed at their opposite ends to the bottom wall 11 adjacent the bearing sleeves 19 and 21.

Referring to Figs. 3 and 4 it will be noted that the bearing sleeve 20 and the axle 37 are formed with diametrically extending apertures 32 and 33 respectively, said apertures being coaxial when the body 10 is in dumping position. A pin 34 may be positioned in the coaxial apertures 32 and 33, and said pin may be L-shaped, as shown, for ease of handling. The pin 34 prevents rotative movement of the axle 37 in the bearing 20, and when so positioned, locks the body in dumping position.

Referring now to Fig. 5 it will be noted that the sleeve 20 and axle 37 are also formed with diametrically extending apertures 35 and 36, said apertures being coaxial when the body 10 is in normal upright position. The pin 34 may alternatively be positioned in the apertures 35 and 36, as shown in Fig. 5, and when in this position said pin also prevents rotation of the axle 37 in the bearing 20.

The cart, in use, is normally filled when in its upright position of Fig. 1. In this position the body 10 is supported both by the wheels 25 and 26 and by the rear legs 15 and 16. To dump the cart, the workman lifts upwardly on the handle 14 until the rockers 30 and 31 strike the ground. This tilting movement is about the axis of the wheels and is in a counterclockwise direction, as viewed in Fig. 1. During this movement the main portions of the stop members 28 and 29 are in engagement with the crank arms 22 and 23. The position of the parts at the instant of engagement of the rockers with the ground is shown in dot and dash lines in Fig. 1. It will be noted that in this position the axle 37 is positioned almost directly below the wheel axis.

Further upward lifting of the handle 14 causes the body to continue to pivot in a counterclockwise direction (as viewed in Fig. 1), but on the rockers 30 and 31 rather than about the wheel axis. During this rocking movement toward the position of Figs. 2 and 3, the axle 37 is raised. The wheels 26 and 27 remain on the ground during the entire tilting movement of the body 10, and the crank arms 22 and 23 freely pivot approximately 120 degrees in a clockwise direction in moving from the dot and dash line position of Fig. 1 to the position of Fig. 2 about the wheel axis.

The portions 28' and 29' of the stop members 28 and 29 are brought into engagement with the crank arms 22 and 23 as the body reaches the dumping position shown in Fig. 3. It will be noted that the crank arms have moved in excess of 180 degrees relative to the body 10 during movement between the main portions of the stops 28 and 29 and the extensions 28' and 29' thereof.

The weight of the pivotally mounted wheel assembly acts as a counterbalance when the body is in the dumping position, and further tilting is thereby prevented. It will be noted that when the body 10 is in the dumping position of Fig. 2, the material therein will flow freely from the body since in this position the open top of the body is tilted well past the vertical, and the portion of the bottom wall 11, which is adjacent the rockers, is almost vertical.

The improved cart is stable in the dumping position of Fig. 2, and may be cleaned or stored while in this position. It may, if desired, be locked in dumping position by inserting the pin 34 in the apertures 32 and 33, as shown in Fig. 4. The improved cart may also be locked in its normal, upright position by inserting the pin 34 in the apertures 35 and 36 when the body 10 is in the position of Figs. 1 and 5.

It is apparent from the above that the invention provides an improved cart which can be easily tilted from normal position to dumping position and which, when in dumping position, is tilted to a considerably greater angle than has heretofore been possible in carts of this type. This feature greatly increases the speed with which dumping and cleaning may be accomplished. The locking feature is useful in preventing unexpected collapse of the improved cart from dumping position as a result of accidentally jarring or otherwise tripping said cart.

Various changes and modifications may be made without departing from the spirit of the invention, and all of such changes are contemplated, as may come within the scope of the claims.

What we claim is:

1. In a cart having a body portion forming a receptacle: crank arms pivotally mounted on said body substantially forwardly of a point midway of the length of the body but substantially rearwardly of the front end of the body, wheels rotatably carried by said crank arms, stop means on the sides of said body having crank arm engaging portions normally positioned in engagement with and above said crank arms and located between the crank arms and the forward portion of the body when the crank arms are extending obliquely upwardly and rearwardly to offset the axis of the wheels rearwardly of and above the axis of the pivotal connection between the body and the crank arms, the body being tiltable forwardly into contact with the ground and the pivotal connection for the crank arms providing for downward movement of the crank arms as the body is tilted, said crank arms being of such limited length and so disposed that there may be a relative swinging movement between the crank arms and body of more than 180 degrees during tilting of the body.

2. In a cart having a body portion forming a receptacle: crank arms pivotally mounted at one end on said body substantially forwardly of a point midway of the length of the body but substantially rearwardly of the front end of the body, wheels rotatably carried by the other end of said crank arms, and stop means on the sides of said body having crank arm engaging portions normally positioned in engagement with and above said crank arms and between the crank arms and the forward portion of the body when said crank arms are extending obliquely upwardly and rearwardly to offset the axis of the wheels rearwardly of and above the axis of the pivotal connection between the body and the crank arms.

3. In a cart having a body portion forming a receptacle: an axle rotatably mounted on said body substantially forwardly of a point midway of the length of said body, crank arms rigidly connected at one end to the ends of said axle, wheels rotatably carried by the other ends of said crank arms, stop means on said body having crank engaging portions normally positioned above said crank arms to be engaged by said crank arms when the latter are extending obliquely upwardly and rearwardly to offset the axis of the wheels rearwardly of the axis of the pivotal connection between the body and crank arms when the body is in normal upright position, and releasable means between said body and axle for locking said axle against rotating movement relative to said body when the body is in a predetermined position.

4. In a cart having a body portion forming a receptacle: an axle rotatably mounted on said body substantially forwardly of a point midway of the length of said body, crank arms rigidly connected at one end to the ends of said axle, stop means on said body having crank engaging portions normally positioned above said crank arms to be engaged by said crank arms when the latter are extending obliquely upwardly and rearwardly to offset the axis of the wheels rearwardly of the axis of the pivotal connection between the body and crank arms when the body is in normal upright position, and releasable means between said body and axle for selectively locking said axle against rotating movement when the body is in normal position or when the body is in tilted position.

5. In a cart having a body portion forming a receptacle: crank arms pivotally mounted on said body substantially forwardly of a point midway of the length of the body but substantially rearwardly of the front end of the body, wheels rotatably carried by said crank arms, stop means on the sides of said body having crank arm engaging portions normally positioned in engagement with and above said crank arms and located between the crank arms and the forward portion of the body when the crank arms are extending obliquely upwardly and rearwardly to offset the axis of the wheels rearwardly of and above the axis of the pivotal connection between the body and the crank arms, the body being tiltable forwardly into contact with the ground and the pivotal connection for the crank arms providing for downward movement of the crank arms as the body is tilted.

WESLEY J. MUELLER.
IRVING R. SMITH.

References Cited in the file of this patent

UNITED STATES PATENTS

| Number | Name | Date |
|---|---|---|
| 677,467 | Potter | July 2, 1901 |
| 1,885,795 | Barrows | Nov. 1, 1932 |
| 2,189,079 | Mueller et al. | Feb. 6, 1940 |
| 2,201,224 | Buchen | May 21, 1940 |
| 2,482,608 | Bedell | Sept. 20, 1949 |

FOREIGN PATENTS

| Number | Country | Date |
|---|---|---|
| 461,297 | Great Britain | Feb. 15, 1937 |